S. G. BAITS AND S. I. FEKETE.
TRACTOR.
APPLICATION FILED MAY 7, 1918.

1,305,433.

Patented June 3, 1919.
2 SHEETS—SHEET 1.

INVENTORS:
Stuart G. Baits
Stephen I. Fekete by MacLeod, Calvert, Copeland & Dike
Attys.

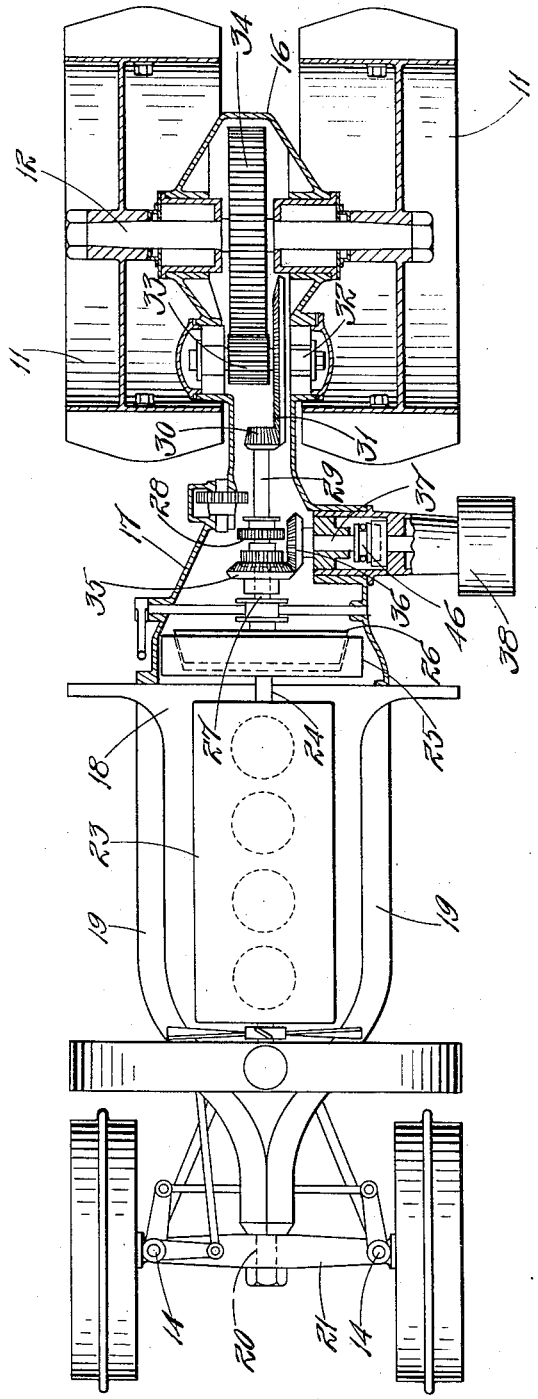

UNITED STATES PATENT OFFICE.

STUART G. BAITS AND STEPHEN IVAN FEKETE, OF DETROIT, MICHIGAN, ASSIGNORS TO HUDSON MOTOR CAR COMPANY, OF DETROIT, MICHIGAN, A CORPORATION OF MICHIGAN.

TRACTOR.

1,305,433.  Specification of Letters Patent.  Patented June 3, 1919.

Application filed May 7, 1918. Serial No. 233,077.

*To all whom it may concern:*

Be it known that we, STUART G. BAITS, a citizen of the United States, and STEPHEN I. FEKETE, a subject of the King of Hungary, both residing at Detroit, county of Wayne, State of Michigan, have invented a certain new and useful Improvement in Tractors, of which the following is a specification, reference being had therein to the accompanying drawings.

The invention relates to farm tractors for use particularly where a small light economical machine is required. The improved tractor is intended primarily to draw two plows or bottoms.

Heretofore tractors for plowing have usually been designed to operate with one wheel in the furrow and with the other on the unplowed land, or else they have been designed to run with both wheels on the unplowed land but with one of the wheels farther from the line of pull of the plows than the other. If the first arrangement is adopted, the wheels must be of a size sufficient to give the requisite clearance between the edge of the unplowed land and the underside of the frame when the wheel is in the furrow. To accomplish this, the wheels must be made of relatively large size, with the result that a large reduction mechanism is required and the center of gravity is high making the machine heavy and uneconomical. If the second arrangement be adopted there is a side component caused by pulling the plows against the side of the furrow which represents wasted power and makes the machine uneconomical.

Our invention, therefore, has for its object to produce a tractor which shall have neither of these faults, and which shall have certain other important advantages. The machine embodying our invention is arranged symmetrically of the line of pull of the plows, and may be made so narrow that it can be driven on the unplowed land without breaking down the edge of the furrow or it may be driven between two rows of corn or the like. The wheels may be made very small so that the center of gravity is very low, and a simple economical reduction gear employed. The machine being very small and compact costs very little to build and is inexpensive to operate.

The invention also makes it possible to employ gears throughout the machine and bearings of relatively cheap material.

While, in the tractor shown herein no differential is employed, the wheels being rigidly attached to the axle, the construction permits of the use of a differential if desired.

The invention will be fully understood from the following description when taken in connection with the accompanying drawings and the novel features thereof will be pointed out and clearly defined in the claims at the close of this specification.

In the drawings, Figure 1 is a side elevation of a tractor embodying our invention in its preferred form showing two plows connected therewith.

Fig. 4 is a plan view partly in section of the tractor.

Figure 1:
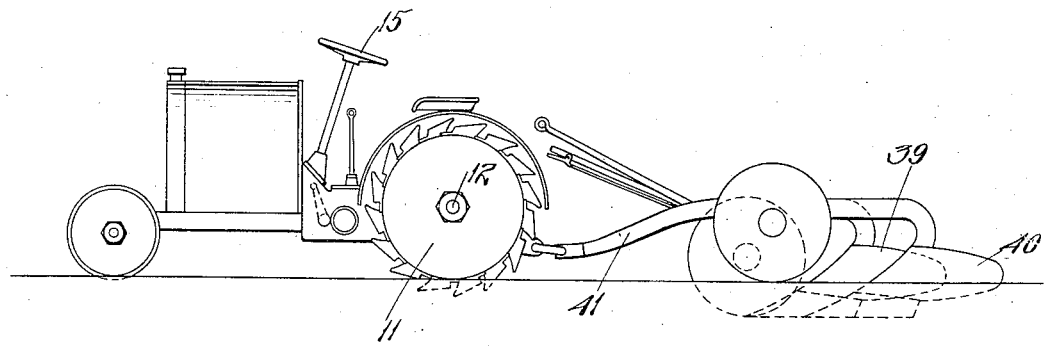
Figure 2:
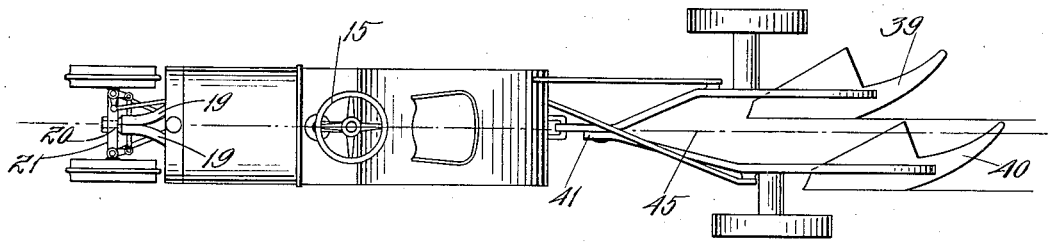
Fig. 2 is a plan view of the tractor and plows shown in Fig. 1.

Referring now to the drawings, the driving wheels which are the rear wheels are indicated at 11, 11. Both wheels are detachably but fixedly secured to the rear axle 12 which extends through the machine from side to side and is unbroken. At the front of the machine is a suitable steering truck or caster which in the form shown in the drawings is composed of two wheels mounted on vertical spindles 14, and operated by a suitable steering mechanism which is preferably of the conventional automobile type. The steering wheel is shown at 15 but the other parts need not be described in detail.

There is no frame in the common acceptation of the word, but the casings or housings for the machinery are united and perform the functions of supporting the machinery. As shown in the drawings, there are three housings namely, the rear axle housing 16, the transmission and clutch housing 17, and the engine bed or crank case 18. The parts are bolted together as shown. From the sides of the engine bed 18, two suitably shaped bars 19 project forwardly and terminate in a trunnion 20 on which the front axle 21 is supported.

The engine 23 is placed lengthwise of the machine, and its crank shaft 24 carries one member 25 of the clutch of any suitable type, the other member 26 is secured to the front end of a transmission driving shaft 27 of a transmission 28 which is preferably of conventional automobile construction and may have any desired number of speeds. In the drawings, a sliding gear transmission having two forward speeds with direct drive on the high speed and one reverse speed is shown. On the rear end of the driven shaft 29 of the transmission is placed a bevel pinion 30 meshing with a bevel gear 31 on a short cross shaft 32. This cross shaft 32 carries a spur pinion 33 meshing with a large spur gear 34 fast on the rear axle 12. The combined diameter of the large spur gear 34, and the spur pinion 33 is less than the diameter of the driving wheels, and the housing 16 is extended laterally into the interior of the driving wheels, that is, outwardly beyond the planes of the adjacent or inside faces of the wheels. This makes it possible to bring the wheels near together and to make a very narrow machine, although space is provided for generous bearings. By this construction, all the important advantages of the single wheel type of tractor are obtained, together with those of the central gear driven type.

At 35 is shown a constantly running bevel gear located on the driving shaft 27 of the transmission. This gear meshes with a pinion 36 on a cross shaft 37 on which is carried a belt pulley 38 connected to shaft by a suitable clutch shown at 46.

At 39 and 40 are shown two plows or bottoms connected to the tractor by a hitch 41. The edge of the furrow is shown at 42 and the lines of cut of the furrows to be turned by the two plows are shown at 43 and 44 respectively. The line of pull of the two plows is shown at 45. The tractor is narrow enough to run on the unplowed strip ahead of the two plows and yet leave a sufficient width adjacent the edge of the furrow so that the edge will not crumble under the weight of the tractor. The tractor is disposed symmetrically of the line of pull of the plows. There is, therefore, no side pull and no consequent loss of power therefrom.

Figure 3:
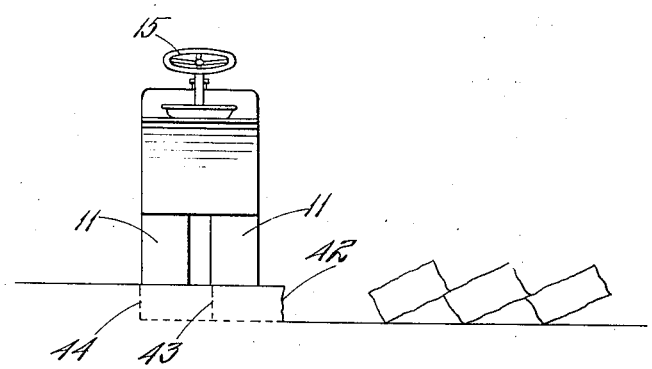
Fig. 3 is a rear elevation of the tractor.

As seen by Figs. 3 and 4 the rear wheels are so close together that obstacles such as stones or hummocks are not likely to get between the wheels and strike any part of the machine even though the wheels are of very small diameter so that there is little clearance. The low wheels bring the center of gravity very low, and consequently the machine has great stability.

The tractor shown and described herein besides having the other advantages mentioned, is, because of the arrangement of parts described, extremely simple to manufacture since it includes no complicated parts which are subjected to heavy strains. It contains a minimum number of bearings and they are subjected to moderate pressures only.

Another important feature of our improved tractor is the fact that there is no part which extends beyond the lines of the edges of the driving wheels. This is made possible by using the housing which surrounds the rear axle and large spur gear as a part of the frame. By reason of its extremely small width the tractor may be driven between rows of corn, cotton, tobacco or the like without disturbing either the plants or the hills.

What we claim is:

1. In a tractor the combination of an engine, an axle, driving wheels fixed to said axle, a spur gear on said axle between the said wheels, a spur pinion meshing with said gear, a change speed gear driving said spur pinion, and a frame which supports the said parts, the rear portion of said frame forming a housing for said rear axle, said spur gear and pinion lying within the periphery of said driving wheels and the housing being extended laterally beyond the planes of the adjacent faces of the said wheels.

2. In a tractor the combination of an engine, an axle, driving wheels fixed to said axle, a spur gear on said axle between the said wheels, a spur pinion meshing with said gear, a change speed gear driving said spur pinion, and a frame which supports the said parts, the rear portion of said frame forming a housing for said rear axle and said spur gear, said spur gear and pinion lying within the periphery of said driving wheels and the housing being extended laterally beyond the planes of the adjacent faces of the said wheels.

3. In a tractor the combination of an engine, an axle, driving wheels fixed to said axle, a spur gear on said axle between said wheels, a spur pinion meshing with said gear and with it constituting a speed reduction, a cross shaft on which said pinion is mounted, a bevel gear, on said cross shaft, a bevel pinion, said bevel gear and pinion constituting a second speed reduction, a change speed gear driving said pinion and itself connected to the engine, and a frame which supports the said parts, the rear portion of said frame forming a housing for the rear axle, the spur gear, the pinion and the bevel gear, said spur gear and pinion lying within the periphery of said driving wheels and the housing being extended laterally beyond the planes of the adjacent faces of the said wheels.

4. In a tractor, the combination of an engine, an axle, driving wheels on said axle, a spur gear on the said axle between the said driving wheels, a cross shaft, a spur pinion on said cross shaft meshing with said spur gear, a bevel gear on the cross shaft, a bevel pinion meshing with said bevel gear, a frame the rear portion of which forms a housing for said rear axle and the parts between said driving wheels, said cross shaft and said spur pinion being located within the periphery of said driving wheels and said bevel pinion being located outside of said periphery.

In testimony whereof we affix our signatures.

STUART G. BAITS.
STEPHEN IVAN FEKETE.